US012600802B2

(12) United States Patent
Johansson

(10) Patent No.: US 12,600,802 B2
(45) Date of Patent: Apr. 14, 2026

(54) CONVERTED STARCH AND FOOD COMPRISING SAID CONVERTED STARCH

(71) Applicant: SVERIGES STÄRKELSEPRODUCENTER, FÖRENING U.P.A., Fjälkinge (SE)

(72) Inventor: Kalle Johansson, Kristianstad (SE)

(73) Assignee: SVERIGES STÄRKELSEPRODUCENTER, FÖRENING U.P.A., Fjälkinge (SE)

( * ) Notice: Subject to any disclaimer, the term of this patent is extended or adjusted under 35 U.S.C. 154(b) by 866 days.

(21) Appl. No.: 17/757,178

(22) PCT Filed: Dec. 15, 2020

(86) PCT No.: PCT/SE2020/051214
§ 371 (c)(1),
(2) Date: Jun. 10, 2022

(87) PCT Pub. No.: WO2021/126057
PCT Pub. Date: Jun. 24, 2021

(65) Prior Publication Data
US 2023/0024363 A1    Jan. 26, 2023

(30) Foreign Application Priority Data
Dec. 18, 2019    (SE) .................................... 1951493-4

(51) Int. Cl.
C08B 30/12        (2006.01)
A23C 20/00        (2025.01)
A23L 29/219       (2016.01)
(52) U.S. Cl.
CPC .............. C08B 30/12 (2013.01); A23C 20/00 (2013.01); A23L 29/219 (2016.08); C12Y 204/01018 (2013.01); A23V 2002/00 (2013.01)

(58) Field of Classification Search
CPC ................................ C08B 30/12; A23L 29/219
See application file for complete search history.

(56) References Cited

U.S. PATENT DOCUMENTS 3,962,465 A    6/1976 Richter et al.
4,937,091 A    6/1990 Zallie et al.
(Continued)

FOREIGN PATENT DOCUMENTS

CN    101631474 A    1/2010
CN    107849411 A    3/2018
(Continued)

OTHER PUBLICATIONS

Office Action mailed Oct. 29, 2024, issued in corresponding Japanese Application No. 2022-536756, filed Dec. 15, 2020, 5 pages.
(Continued)

*Primary Examiner* — Katherine D Leblanc
(74) *Attorney, Agent, or Firm* — CHRISTENSEN O'CONNOR JOHNSON KINDNESS PLLC

(57)    ABSTRACT

A converted starch is disclosed, wherein it has a molecular weight, $M_W$, of 250,000-5,000,000 g/mol, a degree of branching of 3.1-3.9%, an amylose content of at most 7%, and a DE (dextrose equivalents) value of 0.05-0.5, as well as a food product containing the converted starch, a method for the production of said converted starch, wherein it comprises the steps of adding a glucan branching enzyme, chosen from *Rhodothermus obamesis* or *Rhodothermus marinus* enzymes and enzymes from similar organisms having at least 60% amino acid sequence identity with the *Rhodothermus obamesis* or *Rhodothermus marinus* enzyme to an aqueous composition containing starch in a concentration of at least 5% by weight at a temperature of 45-80° C., until a converted starch having a branching degree of 3.1-3.9% is obtained, optionally followed by drying said aqueous solution to a powder of the converted starch, and (Continued)

(a).

(b).

(c).

use of said converted starch for the production of the food product.

6 Claims, 5 Drawing Sheets

(56) References Cited

U.S. PATENT DOCUMENTS

| | | |
|---|---|---|
| 2003/0000798 A1 | 1/2003 | Euverink et al. |
| 2003/0005922 A1 | 1/2003 | Antrim |
| 2003/0007984 A1 | 1/2003 | Euverink et al. |
| 2010/0099864 A1 | 4/2010 | van der Maarel et al. |
| 2012/0121873 A1 | 5/2012 | Mann et al. |
| 2013/0060016 A1 | 3/2013 | Frohberg et al. |
| 2017/0119011 A1 | 5/2017 | Bakker et al. |
| 2017/0260429 A1 | 9/2017 | Mann et al. |
| 2018/0163098 A1 | 6/2018 | Dijk-Van Delden et al. |
| 2019/0010302 A1 | 1/2019 | Wastyn et al. |

FOREIGN PATENT DOCUMENTS

| | | |
|---|---|---|
| EP | 0 932 444 B1 | 1/2002 |
| EP | 1 943 908 A1 | 7/2008 |
| EP | 2 172 489 A1 | 4/2010 |
| EP | 3139761 | 3/2017 |
| FR | 2 499 588 A1 | 8/1982 |
| JP | S6075295 A | 4/1985 |
| JP | 3025869 A | 3/2000 |
| JP | 2003-144187 A | 5/2003 |
| JP | 2013-518562 A | 5/2013 |
| JP | 2017-514509 A | 6/2017 |
| JP | 2018/123901 A | 7/2018 |
| JP | 2020-130039 A | 8/2020 |
| WO | 98/41097 A2 | 9/1998 |
| WO | 98/41112 A1 | 9/1998 |
| WO | 00/66633 A1 | 11/2000 |
| WO | 2004/064540 A1 | 8/2004 |
| WO | 2008/044586 A1 | 4/2008 |
| WO | 2010/030185 A1 | 3/2010 |
| WO | 2015/170983 A1 | 11/2015 |
| WO | 2019/114020 A1 | 6/2019 |

OTHER PUBLICATIONS

Li, Xinfeng, et al., "Partial Branching Enzyme Treatment Increases the Low Glycaemic Property and $\alpha$-1,6 branching ratio of Maize Starch," Food Chemistry 164:502-509, Dec. 2014.

Roussel, X., et al., "Characterization of Substrate and Product Specificity of the Purified Recombinant Glycogen Branching Enzyme of Rhodothermus obamensis," Biochimica et Biophysica Act 1830(1):2167-2177, Jan. 2013.

Supplementary European Search Report mailed Nov. 23, 2023, issued in corresponding European Application No. 20 90 3284, filed Dec. 15, 2020, 3 pages.

International Search Report and Written Opinion mailed Feb. 15, 2021, issued in corresponding International Patent Application No. PCT/SE2020/051214, filed Dec. 15, 2020, 10 pages.

Hansen, M.R., et al., "Gel Texture and Chain Structure of Amylomaltase-Modified Starches Compared to Gelatin," Food Hydrocolloids, 22(8):1551-1566, Dec. 2008.

Hizukuri, S., et al., "Multi-Branched Nature of Amylose and the Action of De-Branching Enzymes," Carbohydrate Research, 94(2), pp. 205-213, Aug. 1981.

Karim, A.A., et al., "Methods for the Study of Starch Retrogradation," Food Chemistry, 71(1):9-36, Oct. 2000.

Nilsson, G.S., et al., "Determination of the Degree of Branching in Normal and Amylopectin Type Potato Starch With 1H-NMR Spectroscopy: Improved Resolution and Two-Dimensional Spectroscopy," Starch/Staerke 48(10):352-357, 1996.

Olempska-Beer, Z., Branching Glycosyltransferase From Rhodothermus Obamensis Expressed in Bacillus Subtilis: Chemical and Technical Assessment (CTA), Dec. 2008, 6 pages.

Sargeant, J.G., and H. Wycombe, "Determination of Amylose: Amylopectin Rations of Starches," Starch/Staerke 34(3):89-92, 1982.

Yokoyama, W., et al., Starch Molecular Mass and Size by Size-Exlusion Chromatography in DMSO-LiBr Coupled With Mulitiple Angle Laser Light Scattering, Cereal Chemistry, 75(4):530-535, Jul. 1998.

(a).                    (b).                    (c).

(a)

(b)

(c)

(d)

(e)

CONVERTED STARCH AND FOOD COMPRISING SAID CONVERTED STARCH

TECHNICAL FIELD OF THE INVENTION

The present invention refers to a converted starch, to a food product comprising the converted starch, to methods for the production of these, and to use of the converted starch for food applications.

BACKGROUND ART

Starch is one of the most used food ingredients in the world. It is primarily used as a thickening agent and thus impart viscosity and texture to food products like soups, sauces, dairy products, fruit preparation etc. It is also used for fat replacement in a large variety of food applications and for many other purposes, e.g. coating of nuts, deep fried foods and as a gelatin replacer in confectionary products, as a stabilizer of oil in water emulsions for liquid emulsions and spray dried functional oils. Starch is found in a large variety of food products in its native state or in a modified form to give the requested performance. Starch is extracted from different botanical sources, e.g. maize, potato, tapioca, wheat, barley, rice etc. and the performance of the starch depends on a number of physical and chemical properties. One of the main characteristics of the starch is the ratio of amylose and amylopectin. The polysaccharide starch is a polymer made from a chemically uniform monomer, the glucose molecule. However, it is a very complex mixture of different forms of molecules which differ with respect to their degree of polymerization and the occurrence of branching of the glucose chains. Starch is therefore not a uniform raw material. A differentiation is made in particular between amylose starch, an essentially unbranched polymer of $\alpha$-1, 4-glycosidically linked glucose molecules, and amylopectin starch, which for its part is a complex mixture of differently branched glucose chains. In typical plants used for starch production, such as maize, potato, wheat, barley, rice, and tapioca, the synthesized starch consists of about 15%-30% of amylose starch and 70%-85% of amylopectin starch.

Amylose is consisting of $\alpha$-1,4-glycosidically linked $\alpha$-D-glucose monomers building up linear glucans with molecular weight ($M_w$) of approximately $3\times10^4$-$10^6$ Da, depending on the origin of the starch and the purity level of different isolated amylose fractions being analyzed. Commercial amylose varies in the degree of purity in that it is not free from amylopectin and as soon as residual amylopectin remains in the sample, the $M_w$-value will increase drastically even at very low residual levels.

Amylopectin consists of a complex mixture of variably branched glucose chains that can be differentiated into A-chains, B-chains with different lengths and C-chain. Unlike amylose, amylopectin is more highly branched and has a molecular weight of between $10^8$ and $10^9$ Da. Side chains are linked to the primary chain (the C-chain, consisting of $\alpha$-1,4-glycosidically linked $\alpha$-D-glucose monomers) via an $\alpha$-1,6-glycosidic bond. Both degree of branching and molecular weight for the amylopectin depends on the origin of the starch. The two macromolecules can be differentiated on the basis of their molecular weights and their different physicochemical properties. In addition to the amylose/amylopectin ratio, the functional characteristics of the starch are strongly influenced by the molecular weight, the side chain distribution pattern and the length of the side chain, the ion content, the lipid and protein content as well as the average starch granular size and its distribution profile. Examples of important functional characteristics are the solubility, the gelatinization behavior, the granule swelling behavior, the water binding capability, the viscosity and texture properties, the retrogradation property, the film forming properties, and the freeze/thaw stability, which is connected with the storage stability in water solutions etc.

A water system where the starch has been gelatinized undergoes a process which in general terms is called retrogradation. During the retrogradation process the starch-water system is reorganized and the process leads to syneresis. The starch molecules reform into new crystalline complexes and the water bound to the starch is released. As a consequence, the reduced water binding capacity leads to the water being released from the starch-water system, a process called syneresis. The retrogradation process is most predominant for the amylose fraction and for the longer outer chains (A-chains, B-chains) of the amylopectin molecule. At low concentrations, this phenomenon will lead to a precipitation of the starch crystalline complexes, and at higher concentrations, it leads to gel formation. For amylose containing starches, this complex is irreversible and will not easily dissolve or lose its gel structure at reasonable temperatures. The retrogradation behavior is seen in the common starches on the market from maize, potato, tapioca, wheat, barley etc. This is well known by a skilled man in the art and depends on the starch properties which in nature depend on from which natural botanical source it is derived from.

In the most common starches, the amylose content is 15-30% whereas in the so-called waxy types the quantity of amylose is lower and normally defined as less than 10%. As the presence of amylose in the starch strongly influences the stability after gelatinization, a lower amount of amylose will have a high impact on the retrogradation behavior. Waxy type starches with an amylose content of less than 10% or even as low as less than 2%, can be found in nature, and these starches have a natural robustness against the retrogradation process but only to a limited level. The retrogradation will for this kind of starches be delayed compared to starches with higher amylose contents. Thus, there is a clear correlation between the amylose content and retrogradation. Further to this, it is well known that naturally occurring starches with an extremely low amylose content, i.e. less than 0.5%, and with a short chain structure of the amylopectin molecule are extremely stable against retrogradation.

The starch retrogradation process is one of the most important factors when differentiating starches and their use in food applications but also in other applications as non-food. Most native starches must undergo some kind of chemical modification to inhibit the retrogradation process, and this inhibition can be achieved by chemical modification of the starch by coupling functional groups to the starch molecule via covalent bonding. The most common chemical modifications used in the starch industry are esterification and etherification. These chemical modifications prevent the retrogradation process of the starch.

Besides the chemical modifications it is also known that physical modifications such as pyrodextrinization and alkaline roasting can be partly used to prevent the retrogradation phenomenon as well as complexing the amylose molecule with lipids like mono-diglycerides.

Retrogradation of starch solutions can also be prevented by enzymatic modification. Degradation of the starch molecules with alpha-amylase has shown to increase the stability against retrogradation, and degradation with beta-amylase has shown a remarkable increase of the stability. If beta-amylase is allowed to totally degrade the amylose molecule and partly the amylopectin molecule, forming a beta-limit dextrin, the resulting starch solution will be extremely stable against retrogradation. The reason for the extreme improvement in the stability after degradation with beta-amylase is that the remaining amylopectin molecule will have a reduced outer chain length size (A-chains, B-chains), and this has proven to increase the retrogradation stability, as well as the freeze/thaw stability. The use of branching enzymes (EC 2.4.1.18) to produce highly branched starch has been described in literature, and the product's reduced retrogradation is well-known (US 2003/0005922).

In WO 2015/170983 and JP 3025869 starch conversion with a branching enzyme is described, and the starch products show resistance of gelling, resistance of retrogradation, anti-aging, high transparency, and stable solutions when solubilized in water. In the information given in the literature the degree of conversion is quite high giving a highly branched low molecular weight polymer with greatly reduced ability to gel (retrograde). In JP 3025869 it is described to use a branching enzyme (potato) to hydrolyze starch to a molecular weight ($M_w$) between 8,000 and 800,000 g/moles for the use in gelled food. The aim in JP 3025869 is to get high transparency of the gel. In WO 2015/170983 it is described that a highly branched starch (degree of branching >6%) can be used as gelling agent in candy, but there is no evidence that the gel would perform as a thermoreversible gel nor having any gel strength at low concentrations. Due to the high degree of branching and the low molecular weight for the preferred embodiment in WO 2015/170983, it is not likely that the product would gel at lower concentrations.

In Novozymes' information sheet for their commercial branching enzyme (Branchzyme®) the intended use is described on waxy and dent corn for production of highly branched polymer with high water solubility. Commercial starch products such as Cluster Dextrin® and Bioglycogen® (Glico Nutrition Co., Ltd.) are based on the conversion with branching enzyme and are highly resistant to retrogradation in water solutions.

The ability of a starch paste or starch solution to form gel upon cooling and storage is widely used in the food industry. In some applications the retrogradation and gel formation gives a sought for texture, mouthfeel or gel strength.

In some starch applications, such as processed cheese for pizza, there is a need for a starch that forms a rigid gel that melts upon heating, and in these cases, it is beneficial with a starch showing thermoreversible gel properties. The thermoreversible property of a starch gel is opposed to the irreversible retrogradation seen for native amylose containing starches.

The ability to form thermoreversible gels has been described for starches enzymatically converted with α-1,4-α-1,4-glucosyl transferase (EC 2.4.1.25) according to EP 0932444 B1. In the case of conversion with EC 2.4.1.25 there are no new α-1,6 branches being made, but the amylose fraction is transferred to the outer amylopectin chains giving a thermoreversible property. A commercial product called Etenia™ (AVEBE) is available and is based on potato starch converted with EC 2.4.1.25.

Thermoreversible starch gel has also been described for debranched starch (U.S. Pat. Nos. 4,937,091, and 5,711,986) using an enzyme capable of cleaving α-1,6 glycosidic linkages (EC 3.2.1.41 or EC 3.2.1.68), where the liberated linear glucose chains contribute to the rigidity of the gel. A commercial product called GEL'N'MELT™ (Ingredion) is available and is based on partially debranched waxy corn.

Starch retrogradation can be determined by a broad range of analytical methods including analyzing the properties of starch gels at both the macroscopic as well as molecular level. Many analytical methods are summarized in Karim A. et al; Food chemistry 71, (2000), 9-36. An easy method for determining the stability of starch is to partly gelatinize the starch, consequently remained in a granular condition as a starch suspension of gelatinized and swollen granules, or totally disrupted into a starch solution in which there are no intact starch granules remaining in the system. The viscosity and texture properties of the starch suspension or solution are analyzed continuously after storage under different conditions which influences the retrogradation behavior.

US 2003/0007984 discloses the use of starch converted with EC 2.4.1.25 as an agent for forming a thermoreversible gel. The molecular structure of the starch will be quite different when using branching enzyme (EC 2.4.1.18) instead of EC 2.4.1.25 since branching enzyme forms more branching points as well as lowering the molecular weight.

WO 00/66633 discloses glucose polymer with very low tendency to retrograde and form gel after conversion with branching enzyme.

FR 2499588 discloses use of branching enzyme from *Bacillus* or *Escherichia* on amylaceus substances to achieve longer shelf life and less retrogradation.

JP 600075295 A discloses a starch product converted with branching enzyme to obtain a non-gelling starch product suitable for foods and drinks. The intention of the present invention is to keep the gelling property of the starch and at the same time get a thermoreversible function.

U.S. Pat. No. 3,962,465 discloses a thermoreversible starch product converted with alpha-amylase, useful in food applications. A drawback of this patent is the low gelling property at concentrations <25%. In addition, the DE of the starch is high (5-8%) compared with the present invention. This could lead to unwanted consequences, such as discoloring of a product plus sweet taste.

US 2012/0121873 discloses a starch based glue composition with starch converted with branching enzyme. Said converted starch has high degree of branching and should give viscostabile (non-retrograding) glue product showing no gelling behaviour.

WO 2010/030185 A1 discloses a method for converting starch with a branching enzyme from family 57 of glycoside hydrolases to reduce the amylose content and retrogradation.

WO 2004/064540 discloses aqueous gel products prepared from enzyme converted pea starch. The starch is converted with alpha-amylase (EC 3.2.1.1) and shows thermoreversible gel properties. Since starch converted with alpha-amylase gets high DE the starch might give drawbacks in the application as mentioned above.

Zofia Olempska-Beer, Chemical and Tecnical Assessment, 4 Dec. 2008, discloses the production and use of branching enzyme from *Rhodothermus obamensis*. The starch converted with said enzyme is described to have high solubility, low viscosity and reduced retrogradation. No indication on gelling behavior or thermoreversible gel properties for a partially converted starch is disclosed in the description.

To conclude, although converted starches with thermoreversible gel properties are already used and known in the food industry, there is still a need for converted starches which has improved properties compared to known converted starches in food products such as for starch containing foods with improved melting properties.

SUMMARY OF THE INVENTION

An object of the present invention is to fulfill the above-mentioned need, i.e. to obtain a starch which has thermoreversible gel properties and which shows more stability against syneresis. This object is reached with a converted starch having the characteristics defined in claim 1. This object is also achieved with a method for the production of said converted starch, and with a method for the production of a food product containing said converted starch. Moreover, this object is also obtained with the use of said converted starch for the production of the starch gel, and with the use of said starch gel for the production of a food product with improved properties.

The present invention refers to a converted starch, wherein it has a molecular weight ($M_w$) of 250,000-5,000,000 g/mol, measured with HPSEC-MALS; a degree of branching of 3.1-3.9%, measured with ${}^1$H-NMR; an amylose content of at most 7%, measured according to the Sargeant method, disclosed in "*Determination of Amylose: Amylopectin Ratios of Starches*; by J. G. Sargeant Hnd, M. Phil. Starch/Die Stärke, Volume 34, Issue 3, 1982, Pages 89-92"; and a DE (dextrose equivalent) value of 0.05-0.5.

The present invention also refers to a food product containing the converted starch.

Further, the present invention refers to a method for the production of the converted starch, wherein it comprises the steps of adding a glucan branching enzyme, chosen from *Rhodothermus obamesis* or *Rhodothermus marinus* enzymes and enzymes from similar organisms having at least 60% amino acid sequence identity with the *Rhodothermus obamesis* or *Rhodothermus marinus* enzyme to an aqueous composition containing starch in a concentration of at least 5% by weight at a temperature of 45-80° C., until a converted starch having a branching degree of 3.1-3.9% is obtained, optionally followed by drying said aqueous solution to a powder of the converted starch.

Moreover, the present invention relates to use of the converted starch for the production of the food product.

The different aspects of the present invention also appear in the independent claims, and further embodiments are disclosed in the accompanying dependent claims.

DETAILED DESCRIPTION OF PREFERRED EMBODIMENTS

Figure 1:
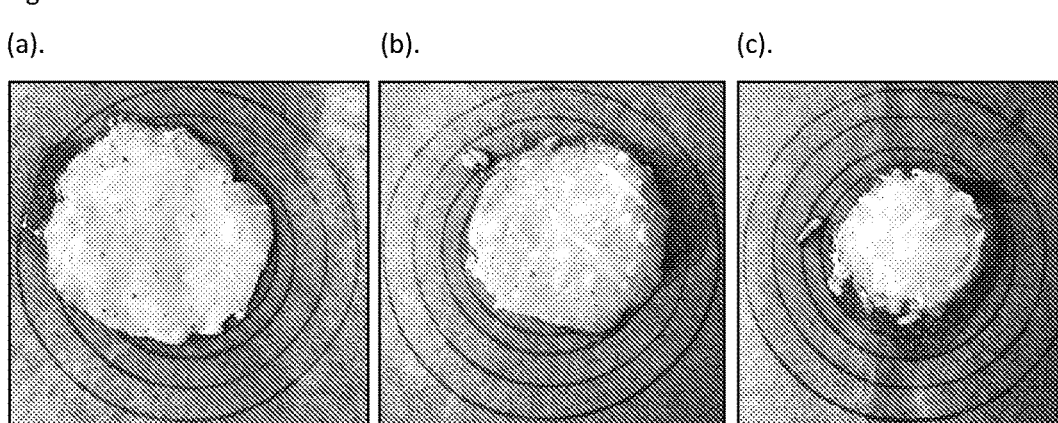
FIG. 1 shows the melting properties of a processed cheese containing converted starch according to the present invention (a) compared to a processed cheese prepared with a commercial starch with thermoreversible gel properties (b), and to a starch without thermoreversible gel properties (c), respectively.

Below some definitions of some terms and expressions used throughout the application text are presented.

The term "degree of conversion" is understood to mean how far the enzyme is allowed to change the molecular structure of the starch before it is stopped, measured by the degree of branching, average chain length and/or molecular weight.

The term "degree of branching" is expressed in % and is understood to represent the number of α(1-6) bonds in relation to the total number of α(1-4) and α(1-6) bonds in the native or converted starch molecule.

The term "average chain length" is understood to mean the average length (DP) of A-, B- and C-chains in the starch molecule.

The term "DP" is understood to mean degree of polymerization, i.e. the number of glucose monomers in a glucan polymer. The DP of the converted starched according to present invention was measured using High-Performance Anion-Exchange Chromatography with Pulsed Amperometric Detection (HPAEC-PAD) according to "*Gel texture and chain structure of amylomaltase-modified starches compared to gelatin*; by Michael Riis Hansen et al, Food Hydrocolloids 22 (2008), Pages 1551-1566".

The term "conversion enzyme" is understood to mean a carbohydrate active enzyme that can be used to transform starch or glucans in any way.

The term "glucan branching enzyme" is understood to mean enzyme capable of transferring a segment of a 1,4-α-D-glucan chain to a primary hydroxy group in a similar glucan chain to create 1,6-α-linkages.

The term "thermoreversible gel" is understood to mean the ability of a paste or a solution to form a gel upon cooling and/or storage and that the gel also has the ability to melt into a solution again when heated.

The term "partially converted starch" is understood to mean a starch product where the enzyme conversion has been stopped before full hydrolysis or conversion of the starch molecule has taken place.

The term "gel strength" is understood to mean hardness or rigidity of a gel, formed from a network of starch molecules in water. The gel strength is defined as the force needed to penetrate a rigid gel with a defined probe measured in a texture analyzer or the storage modulus (G') measured in a rheometer in dynamic mode.

The term "melting temperature" is understood to mean the temperature at which a gel turns from solid state into liquid state, determined as the temperature needed to reach 45 phase angle (δ) between storage modulus (G') and loss modulus (G") measured in a rheometer in dynamic mode.

The term "DE" in understood to mean dextrose equivalents, which is a measure of how many reducing ends there are in a starch compared as a percentage of pure dextrose. The DE value of the converted starched according to present invention was measured according to the Hizukuri method, disclosed in "*Multi-branched nature of amylose and the*

*action of debranching enzymes*; by S. Hizukuri et al, *Carbohydrate Research*, volume 94 (1981), Issue 2, Pages 205-213".

The term "potato" is understood to mean any potato plant belonging to the species *Solanum tuberosum*.

The molecular weight of the converted starched according to present invention was measured according to "*Starch Molecular Mass and Size by Size-Exclusion Chromatography in DMSO-LiBr Coupled with Multiple Angle Laser Light Scattering*; by W Yokoyama et al, *Cereal Chemistry* 75 (1998), 530-535".

In one embodiment the converted starch according to present invention has a molecular weight of 500,000-3,000,000 g/mol, a degree of branching of 3.1-3.9%, an amylose content of at most 3% as measured according to the Sargeant method, disclosed in "*Determination of Amylose: Amylopectin Ratios of Starches* by J. G. Sargeant Hnd, M. Phil. *Starch/Die Stärke*, Volume 34, Issue 3, 1982, Pages 89-92", and a DE (dextrose equivalents) value of 0.1-0.2.

In one embodiment the converted starch according to present invention has an average chain length value of DP (degree of polymerization) 20-33, preferably DP 25-30, measured with NMR or HPAEC-PAD.

In one embodiment the converted starch according to present invention originates from potato, tapioca, maize, wheat, pea, or bean starch.

In one embodiment the converted starch according to present invention also has been modified chemically, physically, or enzymatically.

In one embodiment the food product according to the present invention is chosen from processed cheese, a dairy product, and confectionary.

In one embodiment of the method according to the present invention the *Rhodothermus* enzyme is *Rhodothermus obamensis* or *Rhodothermus marinus* EC 2.4.1.18.

In one embodiment of the method according to the present invention the enzymes from similar organisms have at least 65% sequence with glucan branching enzyme from *Rhodothermus obamensis* (*marinus*).

In one embodiment of the method according to the present invention a solution or a powder of the converted starch is added to a food formulation.

Converted Starch and the Preparation Thereof

The starch used as start material in the method for production of converted starch according to the present invention may have been obtained from potato, tapioca, maize, wheat, pea, bean starch, or any other crop producing amylose-containing starch. These have a substantial amylose content of above 15%, which creates problems with retrogradation and irreversible gel formation. Relatively stable raw materials such as waxy potato, waxy maize, waxy tapioca, waxy barley, and waxy rice, are not receptive for the inventive function due to the low amylose content (<1% amylose). To benefit from the invention, the amylose content in the raw material needs to be >1%.

In the production method a conversion enzyme is mixed with a suspension or solution containing water and starch obtained from any one of the above-mentioned sources in a conventional way. The conversion enzyme used is a glucan branching enzyme chosen from *Rhodothermus obamesis* or *marinus* and enzymes from similar organisms having at least 60%, preferably at least 65%, amino acid sequence homology with the *Rhodothermus obamesis* or *marinus* enzyme. In one embodiment the conversion enzyme is EC 2.4.1.18 CAS No 9001-97-2.

During conversion with such a conversion enzyme the unbranched amylose chains are transferred as outer chains to the branched amylopectin molecule via $\alpha$-1,6-linkage, giving rise to increased degree of branching within the molecule. Segments of the branched amylopectin structure are also transferred to new branching points in the structure. Potato starch is particularly advantageous in this aspect, as it by nature is provided with long outer chains in the amylopectin part. More precisely, the enzyme acts by generating $\alpha$-1,6 linkages in $\alpha$-glucans by cleaving internal $\alpha$-1,4 bonds, which leads to a relative increase in $\alpha$-1,6 branch points in glucans. Further, a segment of a $\alpha$-1,4-D-glucan chain is transferred to a primary hydroxy group in a similar glucan chain.

As discussed above, the presence of amylose in a gelatinized starch normally gives rise to non-thermoreversible retrogradation, i.e. no possibility to melt a gel formed from retrogradation, which is an undesired property for the present invention. Thus, when the amylose is transferred and bound to the amylopectin during the enzyme conversion reaction a possibility of forming a thermoreversible gel is obtained. However, if too many amylose fragments and amylopectin segments are allowed to be transferred to the amylopectin part, a starch solution which is stable against retrogradation and gel formation is obtained, which also is an undesired property in connection with the present invention. Therefore, in accordance with the present invention, the enzyme conversion reaction has to be finalized when the starch solution still has the ability to form a gel. In other words, the degree of conversion due to the hydrolysis action and thereby the branching degree must be controlled in such a way that the product still develops a gel (retrograde) upon cooling and storage. This has been obtained with the optimized partial starch conversion involved in the present invention, which is disclosed more in detail below.

When the conversion enzyme has been mixed with the starch suspension or solution the enzyme is allowed to act until a certain degree of branching of the starch has been reached. A conversion degree to obtain a degree of branching of 3.1-3.9%, preferably 3.2-3.8%, has turned out to be particularly advantageous for the subsequent applications. A lower conversion degree than 3.1 would give rise to a melting temperature of the formed gel that is above the boiling point (above 100 SC), A higher conversion degree than 3.9% would give rise to reduced retrogradation and gel formation ability, as explained above. Thus, it is of importance to interrupt the enzyme conversion step within an optimized branching degree interval with a view to obtaining a partially converted starch giving the specific advantageous properties when gelled and when present in a final food product. The branching degree of the starch product may be measured according to the method of "*Determination of the Degree of Branching in Normal and Amylopectin Type Potato Starch with 1H-NMR Spectroscopy*; by Gunhila S. Nilsson et al, *Starch/Stärke*, Volume 48 (1996), Issue 10, Pages 352-357", by use of $^1$H-NMR (proton nuclear magnetic resonance spectroscopy) or measurement of the DE value after debranching. As an alternative, the branching degree can be estimated by measuring the absorbance maximum of an iodine complex of the starch with a spectrophotometer, as this maximum is changed when the amylose content decreases.

The amount of conversion enzyme to be added depends on its activity, the time period during which the enzyme conversion is performed, i.e. the incubation period, and the amount and initial molecular weight of the added starch. Further, the enzyme activity may also be expressed in branching enzyme units (BEUs). One Branching Enzyme Unit (BEU) is defined as the quantity of the enzyme that causes a decrease in absorbance at 660 nm of an amylose-iodine complex of 1% per minute under standard conditions (pH 7.2; 60'C), In the case of use of the commercial glucan branching enzyme (EC 2.4.1.18), Branchzyme® from Novozymes, for obtaining a converted starch gel having a conversion degree of 3.1-3.9%, the added amount is e.g. 1-50 mg/g starch during an incubation period of 1-48 h and an initial starch molecular weight ($M_w$) of e.g. $3\times10^5$-$10^8$ g/mol. Branchzyme® has a declared activity of 25000 BEU/g enzyme solution according to Novozymes. Thus, the mentioned enzyme addition range of 1-50 mg/g starch corresponds to 25-1250 BEU/g starch.

A further unique property of the converted starch according to the present invention is the increase of the degree of branching compared to that of the original starch source used for the inventive method for the production of the converted starch. For the inventive converted starch having a degree of branching of 3.1-3.9%, preferably 3.2-3.8%, the increase of the degree of branching is 0.1-0.9%, preferably 0.2-0.8%.

The mixing of the conversion enzyme and the starch to be converted may be performed in different ways, and some of these are exemplified below. In one embodiment a slurry comprising starch and water is cooked using a known technique, e.g. jet cooking, or batch cooking in a tank, followed by cooling of the obtained solution and adapting the pH thereof to optimal reaction conditions, i.e. to a value of pH 5-8 and a temperature of 40-85° C. Then the conversion enzyme is added, and the starch is converted during a convenient incubation period depending on the amount of added enzyme and the activity thereof. When the desired branching degree has been reached, which e.g. is measured by using NMR, the conversion step is finalized by lowering the pH to below 3.5 and maintaining the temperature at 80° C. during 30 min to inactivate the enzyme activity. Thereafter, the starch solution can be dried by using well-known techniques (spray drying, vacuum drying, drum drying, heated air drying, etc).

In another embodiment a starch slurry is slowly added to water at a temperature above the gelatinization temperature of the starch, i.e. at 60-80° C. depending on the origin. The conversion enzyme is first added either to the starch slurry or to the tempered water. The dosing and the conversion takes place above the gelatinization temperature of the starch and, preferably, at the pH and temperature optimum of the enzyme i.e. a pH value of 5-8 and a temperature of 40-85° C. After dosing of the starch, the conversion reaction is allowed to take place until the desired branching degree has been reached, e.g. measured by use of NMR. Thereafter, the conversion reaction is finalized by lowering the pH to below 3.5 and maintaining the temperature at 80° C. during 30 min to inactivate the enzyme activity. Thereafter, the starch solution can be dried by using well-known techniques (spray drying, vacuum drying, drum drying, heated air drying, etc).

In a further embodiment the starch is cooked and converted continuously in a flow in which the temperature of the water, the starch, and the enzyme is raised above the gelatinization temperature of the starch, preferably at the pH and temperature optimum of the enzyme i.e. a pH value of 5-8 and a temperature of 40-85° C. When a desired branching degree has been reached, as measured by use of e.g. NMR, the conversion reaction is finalized by lowering the pH to below 3.5 and maintaining the temperature at 80° C. during 30 min. Thereafter, the starch solution can be dried by using well-known techniques (spray drying, vacuum drying, drum drying, heated air drying, etc).

The starch concentration during the enzyme conversion step is of importance for the final function of the starch product. To reach a starch product that exhibit thermoreversible gel properties it is beneficial to convert at a high starch concentration. A less degree of conversion is needed to reach a desired melting temperature when performing the enzyme conversion at higher starch concentrations (see FIG. 6a). Preferably, the starch concentration during enzyme conversion should be more than 5% and most preferably more than 10% (w/w).

A common feature of the three exemplified conversion process embodiments above is that after finalizing the enzyme conversion reaction, inactivation of the conversion enzyme, decreasing the pH, and increasing the temperature, the pH of the solution may be adjusted up to a desired value to fit the final application. Further, it is possible to utilize a purification step before a subsequent drying step, wherein salts and inactivated enzyme are eliminated, e.g. by filtration, activated carbon filtration, precipitation in alcohol, ion chromatography, etc.

During the enzyme conversion step the molecular weight ($M_w$) of the starch is reduced to 250,000-5,000,000 g/mol, preferably 500,000-3,000,000 g/mol. The molecular weight is reduced due to the hydrolytic activity involved in the reaction. When long chains of glucose molecules are broken down due to the hydrolysis with a reduction of $M_w$ occurs at the same time, the number of glucose molecules in each chain is reduced. Indeed, more but shorter chains are obtained. It can be noted that the molecular weight of the starch is reduced without any increase of the DE (dextrose equivalents) value, which is 0.05-0.5, preferably 0.1-0.2, due to transfer of amylose into the amylopectin structure and due to cyclic structures in the glucan. The reduced molecular weight is advantageous in that the viscosity of the food formulation in which it is to be used will not be too high, thereby improving the processability of the food product during heating, e.g. of a processed cheese product. It has also been noted that the molecular weight of the starch decreases with increased enzyme amount and reaction time.

The amylose content of the obtained converted starch according to the present invention is at most 7%, preferably at most 5%. The amylose content is measured by the principal procedure as described by Sargant et al by debranching of the amylopectin molecule and quantifying the remaining part of long amylose chains. As explained above, a higher amylose content would reduce or prevent the melting property of a formed starch gel, i.e. no thermoreversible starch gel.

The average chain length (A-, B- and C-chains) of the converted starch is DP 20-33, preferably DP 25-30, at the conditions above. It can be mentioned that native potato has an average chain length of DP 50.

The converted starch product according to the present invention may be stored and/or sold as such, i.e. in a solution, a starch gel or as a dried powder, before gelling and its final use.

The Thermoreversible Gel and the Preparation Thereof

The converted starch according to the present invention may be used in a method for the production of a thermoreversible starch gel, and this method comprises the step of storing an aqueous solution of the converted starch according to the present invention at a temperature of 1-40° C., preferably 3-10° C. during at least 5 hours, preferably 2-7 days, until a thermoreversible gel has been obtained having a gel strength of 3,000-14,000 Pa (G' at 25° C.) a melting temperature of 40-95° C. after 7 days cool storage at a fixed concentration of the converted starch of 15%. The gel strength (G') is measured by use of a rheometer in dynamic mode or a texture analyzer. The gel strength increases exponentially with increased converted starch concentration, as appears from FIG. 6e).

The present invention also refers to a method for the production of a food having thermoreversible properties. This method comprises the steps of dissolving the powder of the converted starch according to the present invention in a food formulation, and storing the obtained formulation of converted starch and food ingredients/additives at a temperature of 1-40° C. until the foodstuff has reached the desired texture. Thus, according to this embodiment a final food product may be obtained, which constitutes one aspect of the present invention. The gel strength is measured by use of a rheometer in dynamic mode or a texture analyzer. With a texture analyzer a probe is pressed down into the gel or food product, and the force/surface area is then measured.

In another embodiment of the present inventive method the food having thermoreversible properties can be produced by adding the thermoreversible starch gel described above to a food ingredient.

The gel strength and the melting temperature are both dependent on the starch concentration in the gel or food formulation. The storage time, the storage temperature, and the water quality during the solubilisation step may also influence the gel strentgh and the melting temperature, both for the thermoreversible gel as such and for the final food product containing the converted starch.

The melting temperature for a starch gel or a food containing the converted starch influences the mouth feel when the product is melted in the mouth and also the properties during baking/heating (e.g. when the cheese is to melt on a pizza). However, the melting temperature of the food formulation may differ from that in a pure starch gel, as the starch in the food product is just a part of the formulation. The melting temperature, also called the meltability, may be measured with a rheometer in dynamic mode. The storage modulus G' obtained gives a relative value of the gel strength, as appears in the diagram (FIG. 3), and is an indication of the elasticity of the gel. A higher G' value represents a more firm material.

The starch gel obtained is not water soluble at temperatures lower than its melting temperature but if the gel is warmed to above the melting temperature, a starch solution is obtained. Further, the molecular weight, the degree of branching, the chain length, and the amylose content of the converted starch is the same before and after the gelling step, i.e. measured in water solution before gelling and after the formed gel has been melted.

The thermoreversible starch gel obtained is opaque to its appearance. Opacity is a product of instability (retrogradation) in solution and can as such be regarded to be an optical effect. In certain applications, such as for youghurt and cheese, opacity is desired with a view to obtaining a more milk-like appearance, which is of esthetical importance. However, in the literature focus is often set at reduced opacity and stable starch solutions for products converted with branching enzymes.

The present invention will be explained more in detail with reference to the Figures attached. FIG. 1 shows a comparison between melting properties of processed cheese prepared with (a) converted starch according to Example 1 below, (b) Etenia™ 457, (c) Lyckeby Cheese App 50. The results are discussed in Example 8 below.

Figure 2:
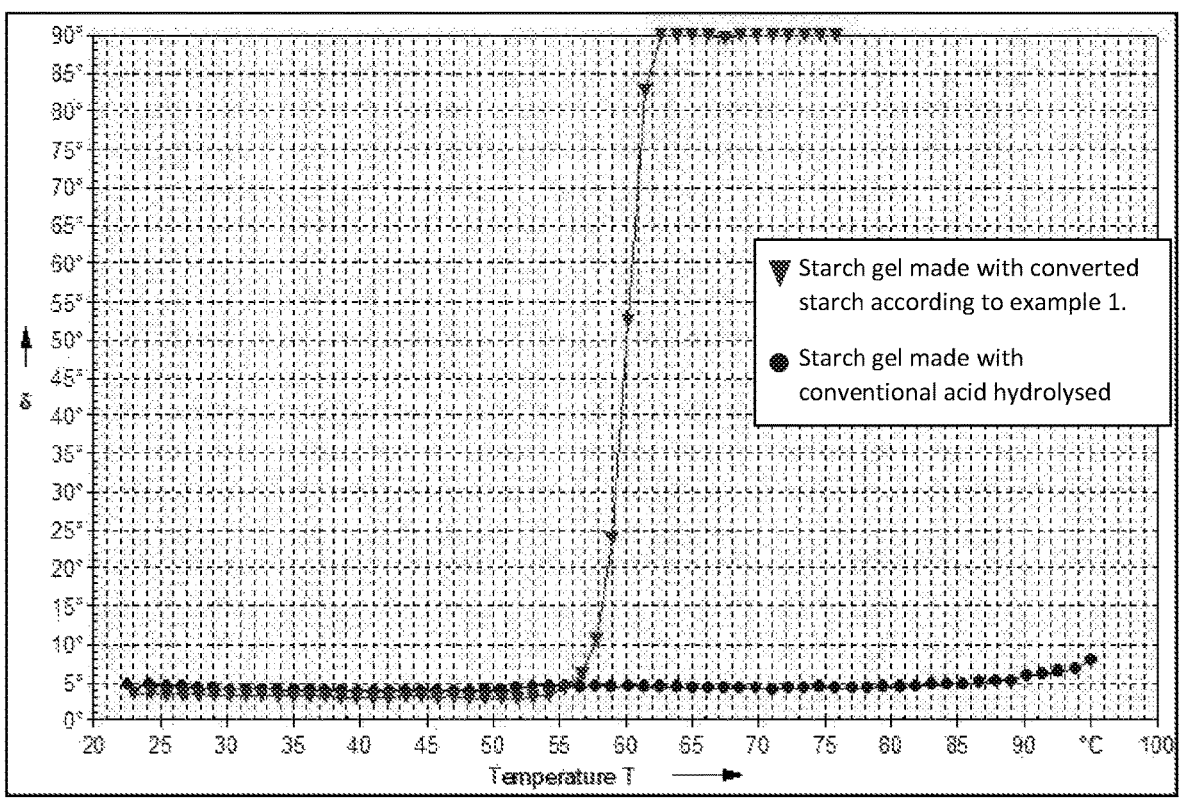
FIG. 2 shows schematically the phase transition from solid state into liquid state for the thermoreversible starch gel according to the present invention based on the converted starch compared to that of a non-thermoreversible starch gel (conventional acid hydrolyzed potato starch). This is measured as the phase angle (δ) between the storage modulus (G') and the loss modulus (G") during a heating ramp measured in a rheometer in dynamic mode, i.e. during conditions in which the structure is not destroyed. The gel melting temperature is defined as the temperature at 45° phase angle.

FIG. 2 shows the results of a measurement of the phase angle (δ) between storage modulus (G') and loss modulus (G"), during heating of a starch gel in a remoter in dynamic mode, to determine the gel melting temperature. Melting temperature is set to be the temperature when the gel transforms from showing a low phase angle to a high at 45° phase angle. The line which is substantially vertical in the middle of the diagram is a gel prepared with converted starch according to Example 1 below, and the substantially horizontal line is a gel prepared with an acid thinned potato starch. The function of the inventive converted starch gel appears from FIG. 2, in which the melting temperature is plotted against the viscosity during a temperature increase when tested for a product with a starch gel in mixture with shredded pizza cheese. For a starch gel based on the converted starch according to the present invention the product becomes meltable, i.e is thermoreversible, at a temperature of approximately 55-95° C., while a product containing a reference starch which not has been converted remained solid throughout the whole temperature interval and was therefore not thermoreversible.

Figure 3:
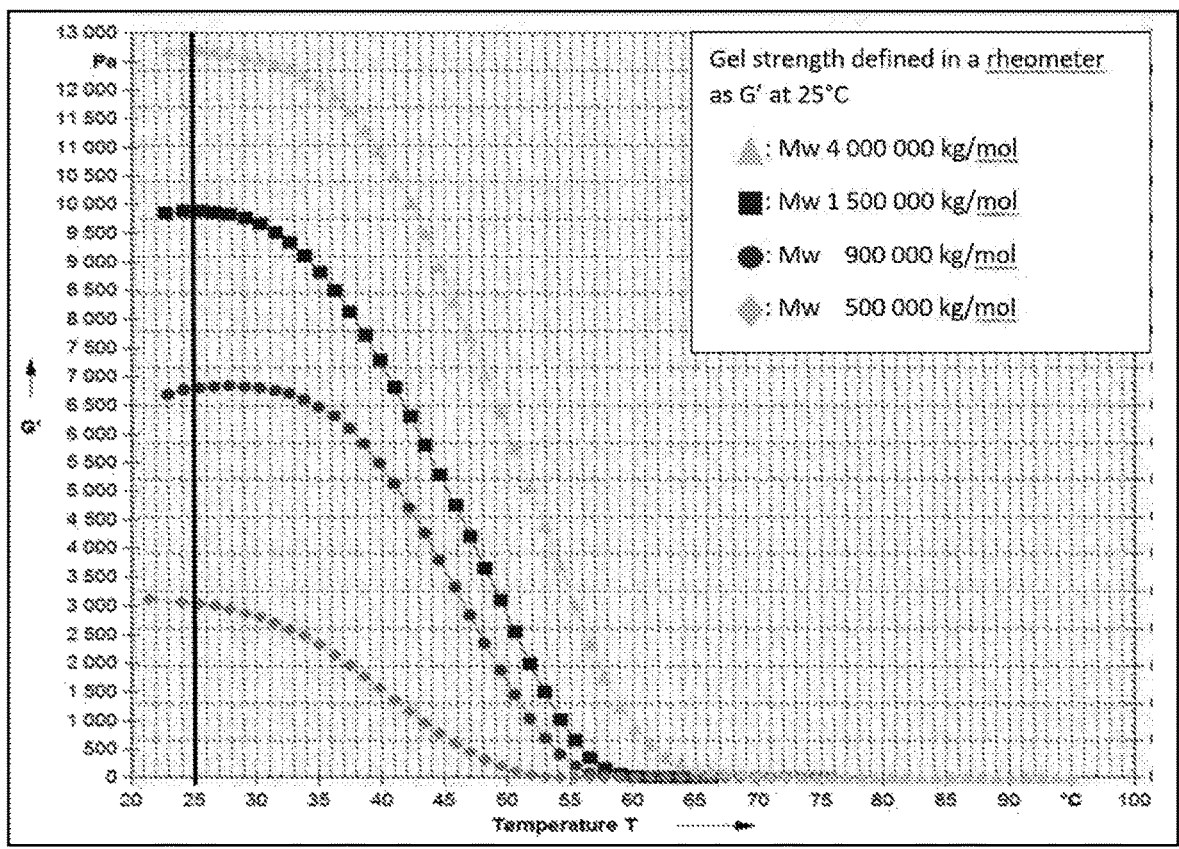
FIG. 3 shows the gel strength for potato starch gels after conversion to different molecular weights ($M_w$).

FIG. 3 shows some examples of the gel strength, measured in a rheometer in dynamic mode, for potato starch gels after conversion to different molecular weights ($M_w$). The gel strength throughout the application is defined as the storage modulus (G') at 25° C.

Figure 4:
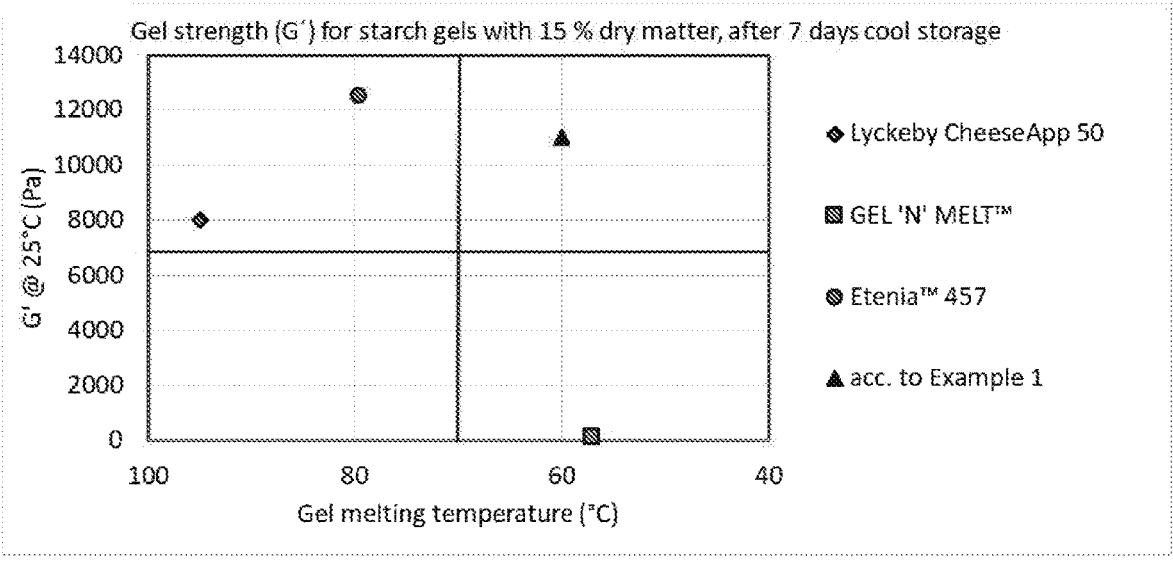
FIG. 4 shows schematically the unique thermoreversible gel properties of converted starch according to the present invention (starch made according to Example 1) compared to those of some relevant commercially available starches. Gel strength versus gel melting temperature for starch gels containing converted starch, were measured in a rheometer in dynamic mode after 7 days storage at 4° C.

FIG. 4 shows a diagram in which the gel strength for a 15% starch gel which has been cold stored during 1 week and been obtained from five different potato starch variants is plotted against the melting temperature (phase angle of 45° between G' and G"). In the diagram *Lyckeby CheeseApp* 50 is a acid hydrolyzed potato starch, Etenia™ 457 is a potato starch treated with amylomaltase EC 2.4.1.25, and Gel'N'Melt™ is a waxy maize treated with pullulanase (EC 3.2.1.41). As appears from the upper right square of the diagram, a low melting temperature is obtained at a high gel strength, which is characterstic for the starch gel according to the present invention from converted starch according to Example 1 below. Thus, a 15% starch gel according to the present invention have satisfactory melting temperature properties in a span of 40-70° C. at a gel strength of 7,000-14,000 Pa.

Figure 5:
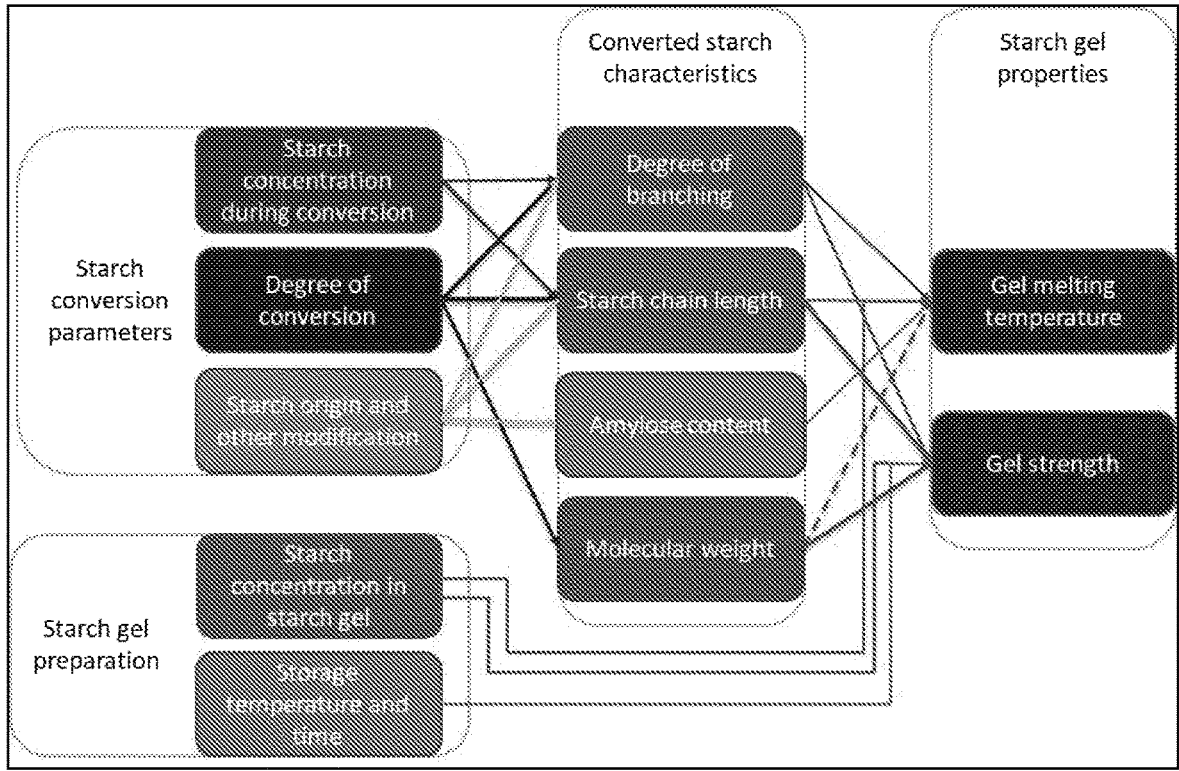
FIG. 5 shows schematically the dependence between some parameters related to the converted starch according to the present invention and the thermoreversible starch gel containing said converted starch.

FIG. 5 shows the dependence between some parameters of relevance in connection with the present invention, i.e. the conversion of starch, the converted starch and the thermoreversible starch gel made from such converted starch according to the present invention. Arrows show what parameter affects what characteristic or property, more precisely how the degree of conversion influences the degree of branching, the starch chain length distribution, and the molecular weight of the converted starch. The starch source with any degree of modification thereof, as well as the original starch concentration during the conversion, also influences the degree of branching, and the starch chain length distribution. The melting properties of the thermoreversible starch gel formed are dependent on the starch concentration of the modified thermoreversible starch gel, the degree of branching, the starch chain length distibution, and partly the molecular weight of the converted starch. The gel strength of the modified thermoreversible starch gel is dependent on the starch concentration of the modified thermoreversible starch gel, the degree of branching, the starch chain length distibution, the molecular weight of the converted starch, and the storage time period and temperature.

Figure 6:
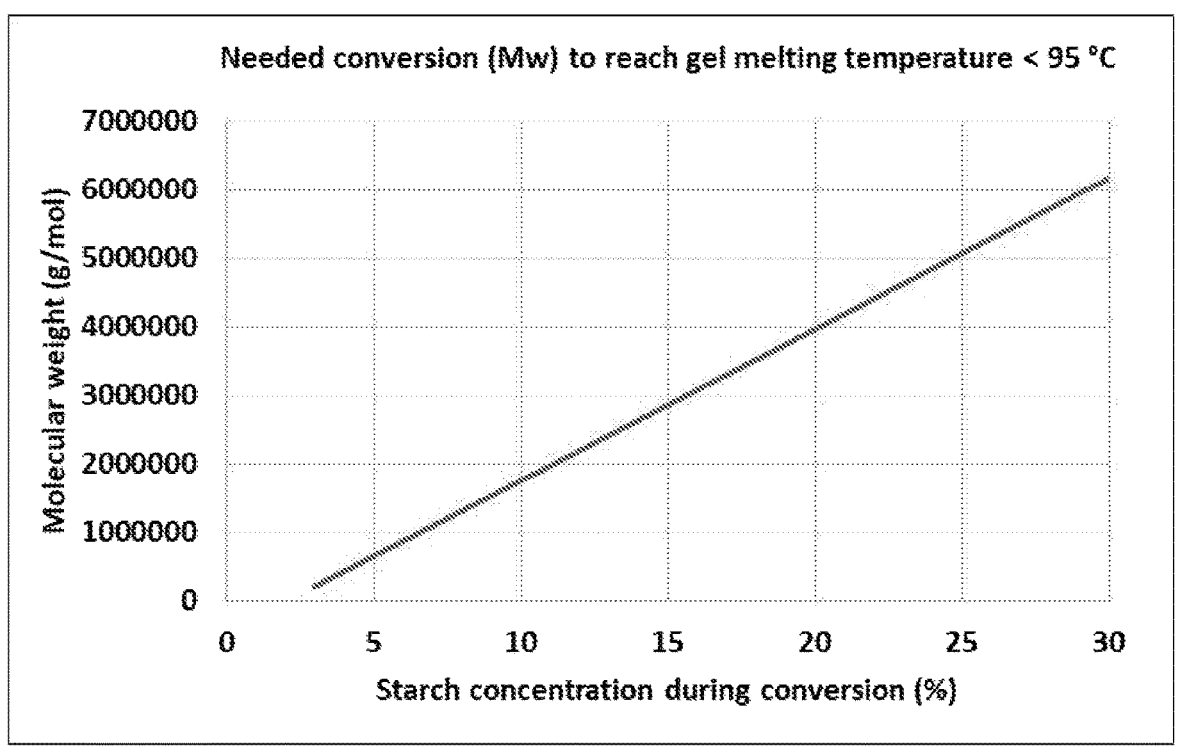
FIGS. 6a)-e) show more specifically the dependence between some of the parameters shown in FIG. 5.
Figure 6:
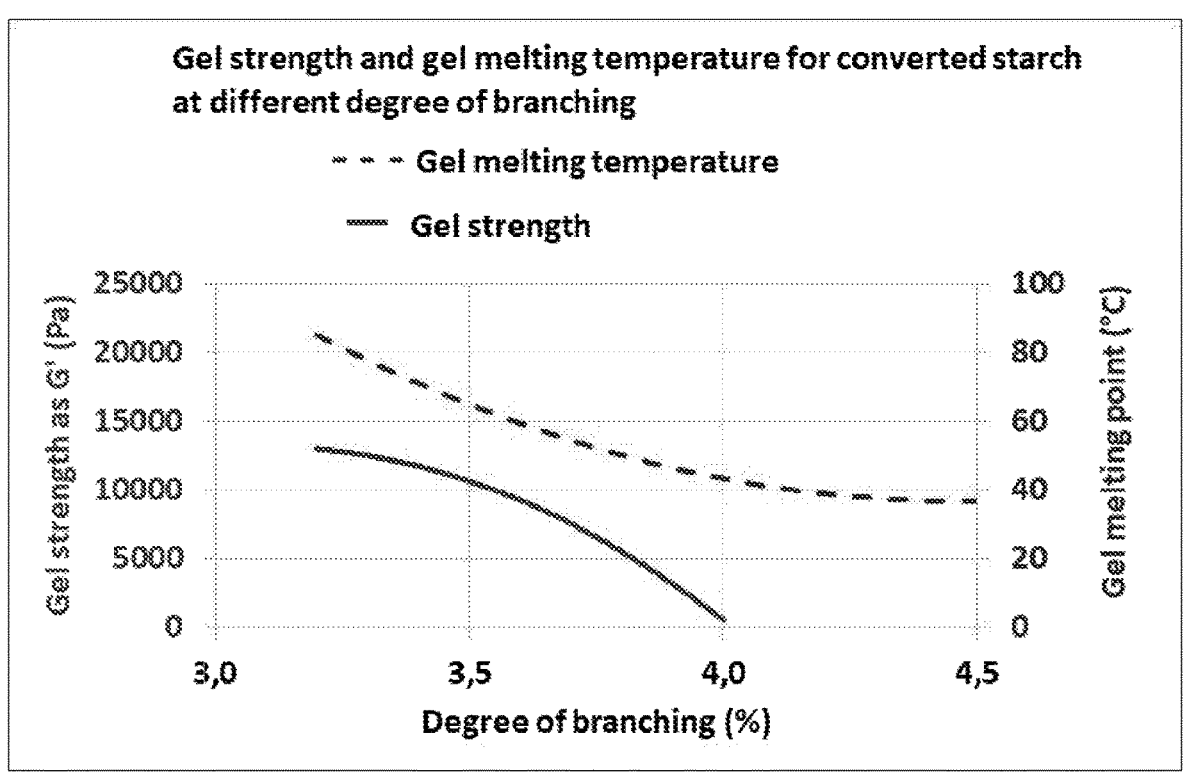
Figure 6:
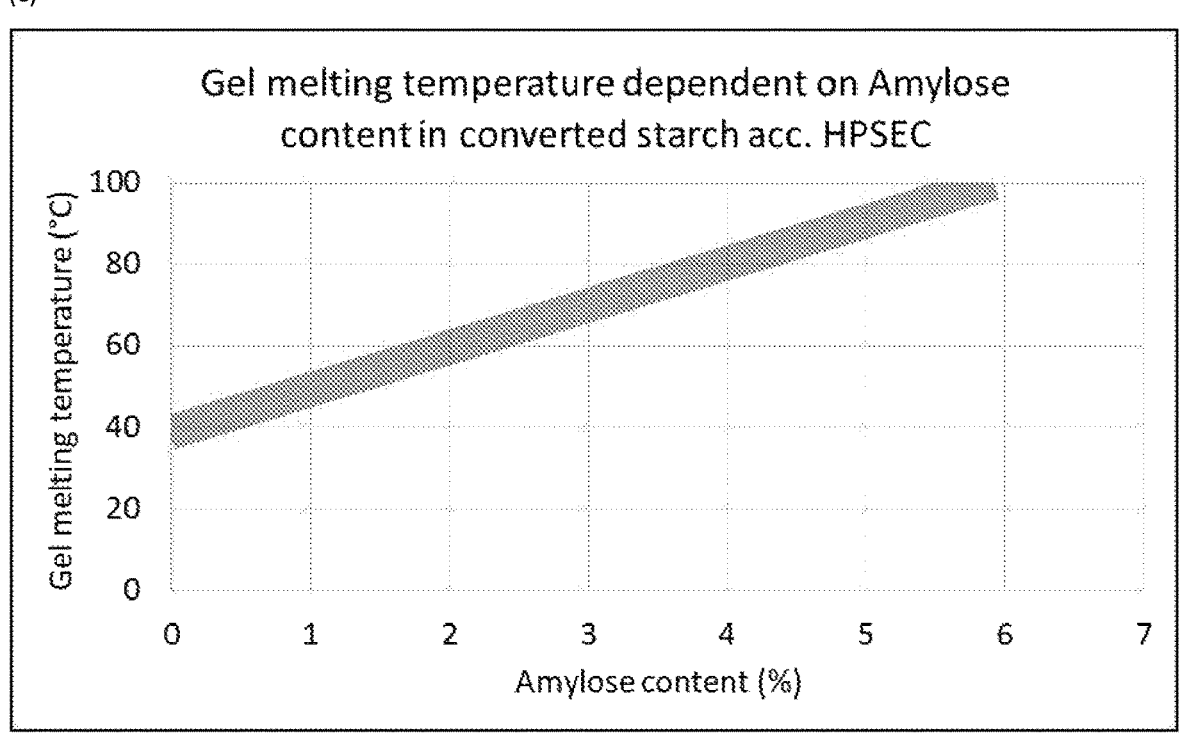
Figure 6:
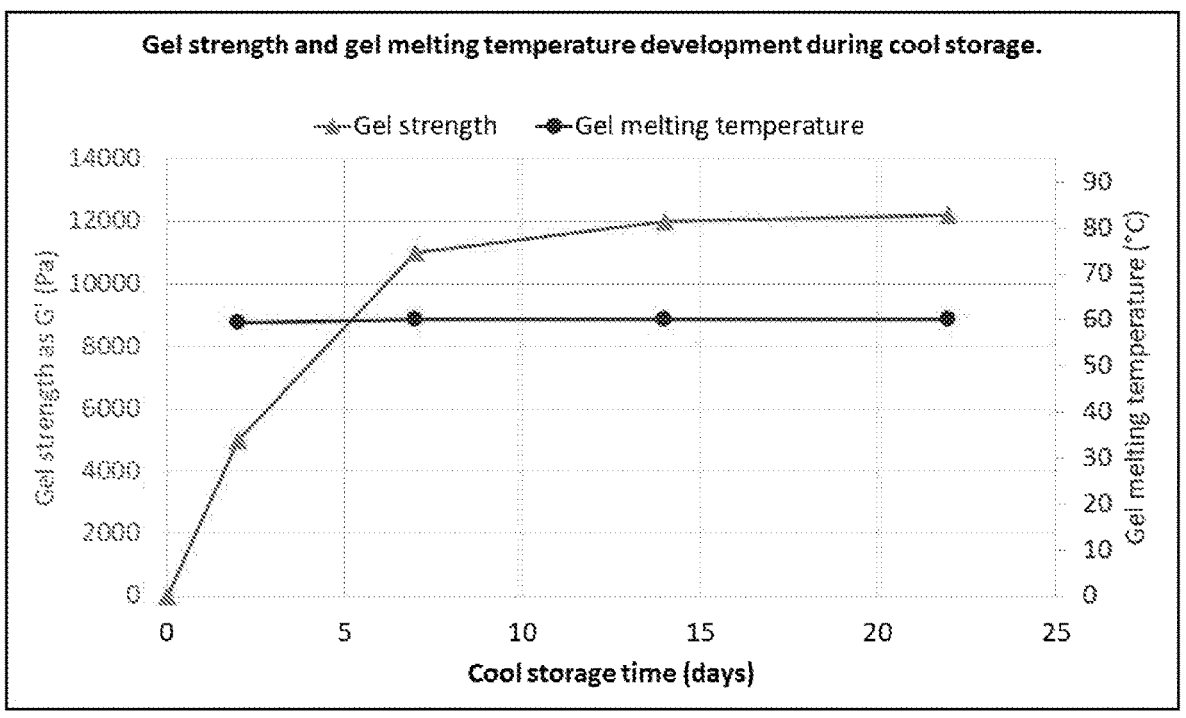
Figure 6:
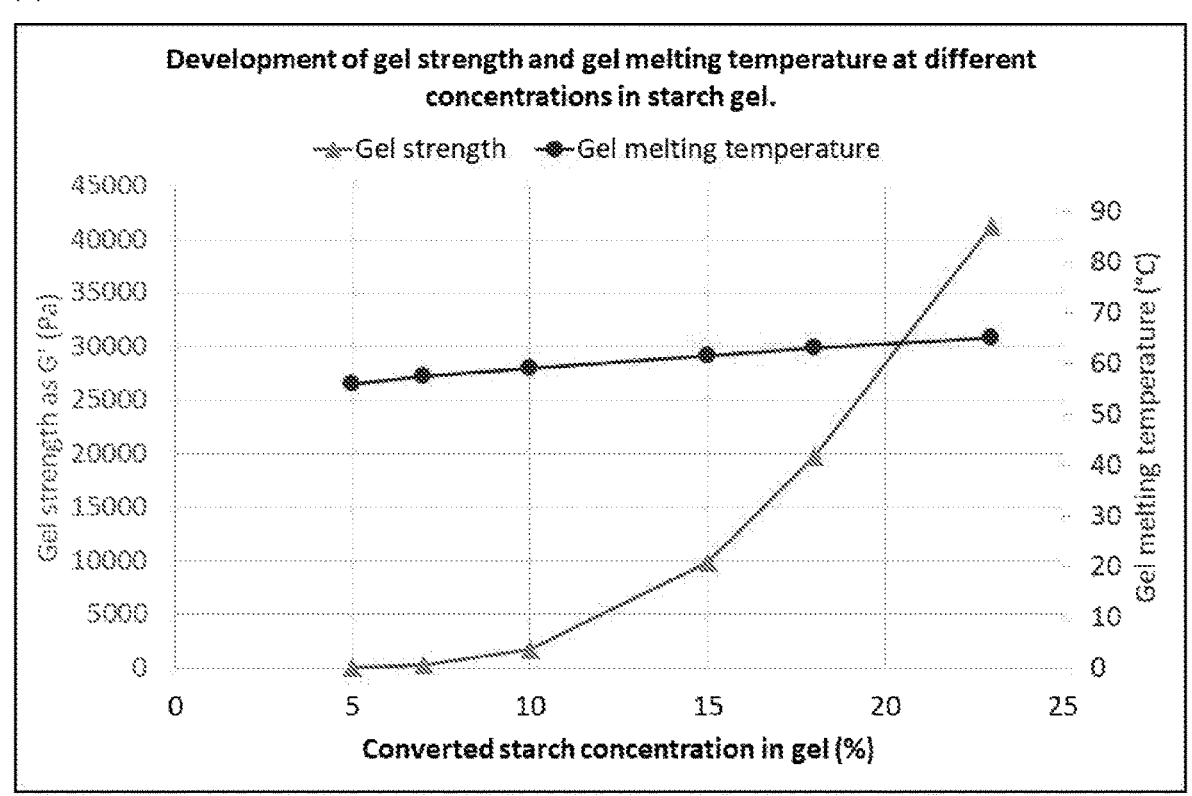

FIG. 6a) shows a diagram in which an example of the importance of the starch concentration during enzyme conversion is visualized. As the starch concentration increases less degree of conversion is needed to reach the thermoreversible gel property, and by that a higher molecular weight can be kept. The higher molecular weight has a positive impact on the starch gel strength as seen in FIG. 3. To reach a gelling starch product the starch concentration during the enzyme conversion step should preferably be more than 5%. For this experiment starch concentration was set to different concentrations during the starch conversion but with same ratio of enzyme to starch.

FIG. 6*b*) shows a diagram in which the gel strength (G') and the melting temperature for the converted starch gel are plotted against the degree of branching. As appears from the diagram, the gel strength and the gel melting temperature decreases with increasing degree of branching. For this experiment 25% starch concentration was used during starch conversion but with varying enzyme dosage. The intervals of interest in the present invention is a degree of branching between 3.1 and 3.9%.

FIG. 6*c*) shows a diagram in which the amylose content, measured with HPESC using the principles by Sargeant et al, for the converted starch is plotted against the gel melting temperature. It is clear that the starch product should not contain more than 7% amylose to be able to have a melting temperature of under 100° C.

FIG. 6*d*) shows a diagram in which the gel strength at 25° C. and the gel melting temperature for converted potato starch measured after different time periods of cool storage. In this experiment a converted potato starch with molecular weight ($M_w$) of 1,500,000 g/mol was used to make a starch gel with a concentration of 15%. As appears from the diagram the gel melting temperature is constant, i.e. approximately 60° C., during the storage time period, while the gel strength increases the first days, but is planning out after approximately 5 days and further on.

FIG. 6*e*) shows a diagram in which the gel strength at 25° C. and the gel melting temperature for converted potato starch plotted against the starch concentration (% DM) in the starch gel. In this experiment a converted potato starch with molecular weight ($M_w$) of 1,500,000 g/mol was used for the preparation of the starch gels and the storage time in cool storage was 7 days. As appears from the diagram, the melting temperature is almost constant, i.e. between 60 and 70° C., with increased starch concentration, i.e. the melting temperature increases with approximately 0.5° C. when the starch concentration increases with 1%, while the gel strength increases exponentially.

The characteristics related to the converted starch according to the present invention may be measured with the following equipment:

Molecular weight ($M_w$) (g/mol): HPSEC-MALS (High Performance Size exclusion chromatography with Multy Angle Laser Scattering detector).

Branching degree (% 1,6-α-linkages): NMR (Nucleic Magnetic Resonance) or DE (Dextrose Equivalents) before and after debranching.

Average chain length (DP): NMR or HPAEC-PAD after debranching (High Performance Anion Exchange Chromatography with Pulsed Amperometric Determination) by the method according to "*Determination of the Degree of Branching in Normal and Amylopectin Type Potato Starch with 1H-NMR Spectroscopy*" Gunilla S. Nilsson et al; *Starch/Stärke*, Volume 48 (1996), Issue 10, Pages 352-357.

Viscosity (cP): viscosimeter

The characteristics related to the converted starch gel may be measured with the following equipment:

Gel strength (N/cm² or Pa): texture analyzer or storage modulus (G') in a rheometer in dynamic mode Loss modulus, G", (Pa): rheometer in dynamic mode Gel melting temperature (° C.): rheometer in dynamic mode, DSC, DMTA

Examples of food applications for the inventive converted starch are processed cheese, such as pizza cheese, non-dairy products, such as vegan cheese analogue, dairy products, and confectionary, but also sauces, dried instant food and low fat products. E.g., the processed cheese exhibit good shredability and excellent melting properties.

As mentioned above, native starch as well as modified starch can be used as material for conversion with branching enzyme. Additional chemical, physical or enzymatic modification can also alter the melting temperature of the final gel, giving even broader range of melting temperatures and gel strength. A chemical modification can also reduce syneresis of the starch gel giving it better cold storage properties. As also mentioned above, the gelling and thermoreversible property of the inventive converted starch product is useful in a range of foods, such as processed cheese, dairy products, confectionery etc. The inventive converted starch is especially suitable for processed cheese (e.g. pizza cheese) due to the high gel strength and thermoreversibility, contributing to shredability and excellent melting properties.

Other advantages with the present invention is that the starch product has some improved properties, such as lower process viscosity, and a slow gel setting that eases the production of the final application and reduces the risk of dogging in process equipment and pipes.

EXPERIMENTS

Example 1

Conversion of Potato Starch with Glucan Branching Enzyme

A suspension having a dry matter of 35% of water and potato starch, was pumped into a warm (70° C.) water solution containing glucan branching enzyme (EC 2.4.1.18) from *Rhodothermus obamensis* (Branchzyme®, Novozymes). The dosage of the starch suspension was continuous during 3 hours to keep the viscosity low enough for efficient stirring. The dry matter after starch addition was 25% and the amount of enzyme was 1.5 g/l in the final mixture. With an enzyme activity of 25000 BEU/g for *Rhodothermus obamensis*, the enzyme concentration during incubation was 37500 BEU/l (or 150 BEU/g starch). The temperature was held constant at 70° C., and the pH was adjusted to 6.5 during starch dosage and incubation. After a total incubation time of 20 hours the enzyme activity was stopped by decreasing the pH to below 3.5 and heating the mixture to above 80° C. for 30 min. The mixture could then be adjusted to a neutral pH, concentrated, dried and milled into a powder. The final converted starch product had a molecular weight ($M_w$) of $1.5 \times 10^6$ g/mole, a degree of branching of 3.5%, an average chain length of DP 28, an amylose content of less than 2%, and a dextrose equivalents (DE) value of less than 1%.

Example 2

Conversion of Potato Starch with Glucan Branching Enzyme.

A suspension having a dry matter of 35% of water and potato starch, was pumped into a warm (70° C.) water solution containing glucan branching enzyme (EC 2.4.1.18) from *Rhodothermus obamensis*. The starch dosage was continuous during 5 hours to keep the viscosity low enough for efficient stirring. The dry matter after starch addition was 25% and the amount of enzyme was 0.65 g/l in the final mixture. With an enzyme activity of 25000 BEU/g for

*Rhodothermus obamensis*, the enzyme concentration during incubation was 16250 BEU/l (or 65 BEU/g starch). The temperature was held constant at 70° C., and pH was adjusted to 6.5 during starch dosage and incubation. After a total incubation time of 20 hours the enzyme activity was stopped by decreasing the pH to below 3.5 and heating the mixture to above 80° C. for 30 min. The mixture could then be adjusted to a neutral pH, concentrated, dried and milled into a powder. The final converted starch product had a molecular weight ($M_w$) of $4.5 \times 10^6$ g/mole, a degree of branching of 3.3%, an average chain length of DP 31, an amylose content of less than 5%, and a dextrose equivalents (DE) value of less than 1%.

Example 3

Conversion of Potato Starch with Glucan Branching Enzyme.

A suspension of demineralized water and potato starch was gelatinized in a jet cooker at 140° C. and a dry matter content of 10%. The starch solution was cooled to 70° C. before a glucan branching enzyme (EC 2.4.1.18) from *Rhodothermus obamensis* was added to a concentration of 1.3 g/l in the final mixture. With an enzyme activity of 25000 BEU/g for *Rhodothermus obamensis*, the enzyme concentration during incubation was 32500 BEU/l (or 325 BEU/g starch). The temperature was held constant at 70° C., and the pH was adjusted to 6.5 during incubation. After a total incubation time of 20 hours the enzyme activity was stopped by decreasing the pH to below 3.5 and heating the mixture to above 80° C. for 30 min. The mixture could then be adjusted to a neutral pH, concentrated, dried and milled into a powder. The final converted starch product had a molecular weight ($M_w$) of $1.2 \times 10^6$ g/mole, a degree of branching of 3.3%, average chain length of DP 30, an amylose content of less than 3%, and a dextrose equivalents (DE) value of less than 1%.

Example 4

Preparation and Characterisation of Starch Gel.

A converted starch product according to Example 1 was solubilized in hot water (90° C.) to a dry matter of 10% respectively 15%. The starch solution was stored at 4° C. in a cooler for seven days to develop a gel. The gel strength at 10% dry matter was measured in a rheometer in dynamic mode to 2,000 Pa according to a test A as well as with a texture analyser to 122 g/cm² according to a test B. The gel strength and gel melting temperature at 15% dry matter were measured in a rheometer to 12,000 Pa and 59° C. according to test A.

In test A the starch gel is placed between plastic sheets, rolled into a homogenous paste, and placed in a rheometer in dynamic mode with plate/plate configuration. The gap is set to 1 mm and the oscillation mode with 1% strain, and 1 Hz frequency is used during measurement. The temperature is increased from 25 up to 95° C. with 2° C. per minute. The storage modulus (G'), loss modulus (G") and phase angle (δ) can be obtained from the analysis.

In test B the starch gel in its container (280 ml, 95 mm diameter) is placed in the texture analyser, and a cylindric probe (25 mm diameter) is forced 10.0 mm into the gel at 2 mm/s. The maximum force recorded is divided with the probe contact area to get the gel strength (g/cm²).

To evaluate the thermoreversibility of the starch gel, multiple gelling and melting cycles of the starch were performed. The rigid gel after storage was heated to 70° C., whereupon the gel turned into a low viscous solution. The starch was once again stored at 4° C. to develop a rigid gel which could again be melted at 70° C.

Example 5

Preparation and Characterisation of Starch Gel.

A converted starch product according to Example 2 was solubilized in warm water (90° C.) to a dry matter of 10% respectively 15%. The starch solution was stored at 4° C. in a cooler for seven days to develop a gel. The gel strength at 10% was measured to 197 g/cm² in a texture analyser according to a test B. The gel strength and gel melting temperature at 15% dry matter were measured in a rheometer to 14,000 Pa and 84° C. according to test A.

Example 6

Preparation and Characterisation of Starch Gel.

A converted starch product according to Example 3 was solubilized in warm water (90° C.) to a dry matter of 10% respectively 15%. The starch solution was stored at 4° C. in a cooler for seven days to develop a gel. The gel strength at 10% was measured to 140 g/cm² in a texture analyser according to a test B. The gel strength and gel melting temperature at 15% dry matter were measured in a rheometer in dynamic mode to 9,000 Pa and 70° C. according to test A.

Example 7

The characteristics of the starch gel according to Example 4 was compared to the starch gel from other types of converted starches. All starch gels were prepared by first solubilizing the starch in hot water at 10% dry matter, until a clear solution appeared, and were then stored at 4° C. in a cooler for seven days to develop a gel. The gel strength was measured in a texture analyser according to a test B, and the gel melting temperature was determined in a rheometer in dynamic mode according to a test A. The results are reported in Table 1 below. It was clear that starch converted with branching enzyme (EC 2.4.1.18) had much lower gel melting temperature than starches from other conversions, at similar gel strengths.

TABLE 1

| Starch material (potato based) | Converted with EC 2.4.1.18 | Converted with EC 2.4.1.25 | Converted with EC 3.2.1.1 | Acid thinned with $H_2SO_4$ |
|---|---|---|---|---|
| Molecular weight, $M_w$ (g/mol) | 1,500,000 | 3,000,000 | 1,400,000 | 1,600,000 |
| Amylose content, (%) (according to Sargeant et al.) | 1.5 | 1.0 | 5.0 | 9 |
| Deg. of branching (%) | 3.5 | 2.0 | 3.2 | 3.2 |
| Dextrose Equivalents (D.E.) | 0.14 | 0.08 | 1.1 | 0.3 |
| Gel strength (g/cm²) | 122 | 122 | 120 | 118 |

TABLE 1-continued

| Starch material (potato based) | Converted with EC 2.4.1.18 | Converted with EC 2.4.1.25 | Converted with EC 3.2.1.1 | Acid thinned with $H_2SO_4$ |
|---|---|---|---|---|
| Gel melting temperature (° C.) | 59 | 77 | 95 | >100 |

Example 8

Preparation and Evaluation of Processed Cheese.

Converted starch according to Example 1 was used in the following standard recipe (see Table 2 below) to produce processed cheese with good melting properties.

TABLE 2

| INGREDIENTS | % |
|---|---|
| Water | 47.64 |
| Vegetable fat | 24.00 |
| Rennet casein | 15.00 |
| Converted starch | 10.00 |
| Salt | 1.20 |
| Emulsifying salt | 1.50 |
| Citric acid | 0.50 |
| Cheese flavour | 0.15 |
| Beta carotene | 0.01 |
| Total | 100.00 |

Water, emulsifying salt, and casein was mixed in a Stephan mixer. Starch, salt, cheese flavour, and beta carotene were added and the blend was mixed for 30 s at 1500 rpm. The mixture was heated to 75° C. at 750 rpm for 2 minutes. The melted fat and the acid were added and mixed for another minute. The paste was stored at 4° C. After 4 days the processed cheese was evaluated in view of shreddability with a shredder and in view of meltability in an oven. The result showed good shreddability with low stickiness, and the melting properties were better than products produced with the other compared starches shown in FIG. 1 (*a*)-(*c*). The melting property was compared between shredded processed cheese prepared with potato starch converted with EC 2.4.1.18 (a), commercial potato starch Etenia™ 457 converted with EC 2.4.1.25 (b), and commercial acid thinned potato starch Lyckeby CheeseApp 50 (c). After heating in an oven it was clear that the processed cheese containing potato starch converted with branching enzyme (EC 2.4.1.18) had superior melting property.

The invention claimed is:

1. A converted starch that includes, among its other features, an average chain length value of DP (degree of polymerization) 20-33, measured with NMR or HPAEC-PAD, a molecular weight ($M_W$) of 250,000-5,000,000 g/mol, measured with HPSEC-MALS; a degree of branching of 3.1-3.9%, measured with $^1$H-NMR; an amylose content of at most 7%, measured according to the Sargeant method; and a DE (dextrose equivalents) value of 0.05-0.5, measured according to the Hizukuri method.

2. The converted starch according to claim 1, wherein it has a molecular weight ($M_W$) of 500,000-3,000,000 g/mol, a degree of branching of 3.2-3.8%, an amylose content of at most 3%, and a DE (dextrose equivalents) value of 0.1-0.2.

3. The converted starch according to claim 1 wherein the starch originates from potato, tapioca, maize, wheat, pea, or bean starches.

4. The converted starch according to claim 1 wherein it also has been modified chemically, physically, or enzymatically.

5. A food product containing the converted starch according to claim 1.

6. The food product according to claim 5, wherein the food product is chosen from processed cheese, a dairy product, and confectionary.

* * * * *